(12) United States Patent
Lashley et al.

(10) Patent No.: US 8,311,210 B1
(45) Date of Patent: Nov. 13, 2012

(54) ISOLATED HIGH GAIN LINE AMPLIFIER CIRCUIT

(75) Inventors: David G. Lashley, Cartersville, GA (US); Robert L. Doss, Ringgold, GA (US)

(73) Assignee: Plantronics, Inc., Santa Cruz, CA (US)

( * ) Notice: Subject to any disclaimer, the term of this patent is extended or adjusted under 35 U.S.C. 154(b) by 1873 days.

(21) Appl. No.: 11/479,663

(22) Filed: Jun. 30, 2006

(51) Int. Cl.
*H04M 9/00* (2006.01)

(52) U.S. Cl. ........ 379/395; 379/394; 379/396; 381/104; 381/107

(58) Field of Classification Search ..... 379/387.01–397; 381/104–109
See application file for complete search history.

(56) References Cited

U.S. PATENT DOCUMENTS

| | | | | |
|---|---|---|---|---|
| 4,000,370 A | * | 12/1976 | Smith et al. | 381/104 |
| 4,696,036 A | * | 9/1987 | Julstrom | 381/22 |
| 5,029,203 A | * | 7/1991 | Ikefuji et al. | 379/391 |
| 5,642,075 A | * | 6/1997 | Bell | 330/129 |
| 6,137,879 A | * | 10/2000 | Papadopoulos et al. | 379/387.01 |
| 6,348,842 B1 | * | 2/2002 | Raina et al. | 331/176 |
| 6,370,245 B1 | * | 4/2002 | White | 379/390.04 |
| 6,671,371 B1 | * | 12/2003 | McNeill et al. | 379/387.01 |
| 2002/0061103 A1 | * | 5/2002 | Pehrsson | 379/387.01 |

* cited by examiner

*Primary Examiner* — Yuwen Pan
*Assistant Examiner* — Ibraham Sharifzada
(74) *Attorney, Agent, or Firm* — Chuang Intellectual Property Law

(57) ABSTRACT

Systems and methods for a line amplifier circuit are disclosed. The line amplifier circuit generally includes a first microphone transmit line, a second microphone transmit line, and a light emitting diode with a controllable variable light output. A photo-resistor cell is coupled across the first microphone transmit line and the second microphone transmit line. The photo-resistor cell is operable to attenuate gain on the first microphone transmit line and the second transmit line responsive to the controllable variable light output from the light-emitting diode.

20 Claims, 2 Drawing Sheets

ISOLATED HIGH GAIN LINE AMPLIFIER CIRCUIT

BACKGROUND OF THE INVENTION

Telephones typically either do not include any provision for adjusting the volume of the conversation presented to the receiver portion of the telephone handset, or do not have the ability to adjust the volume to a sufficiently high level as required by certain users such as the hearing impaired. Accordingly, where there is a poor connection or the user is hearing impaired, the volume output by the receiver may be undesirably low. The user has little recourse other than asking the other party to speak more loudly. Therefore, it is desirable that the user have available a line amplifier that is readily attached to a standard telephone and adjustable to the user's desired volume level.

Line amplifiers are attached to a telephone between the base part of the phone and the handset and provide receiver gain. Below a certain gain level applied to the receiver, the line amplifier acts merely as a "pass through" for the microphone signal being transmitted unmodified from the handset to the telephone base. When acting as a pass through, it is not necessary to know the polarity of the microphone transmit wires when the line amplifier is inserted or necessary to modify the signal level of the microphone signal.

However, the use of line amplifiers to provide more than a certain level of gain on the receive signal to be output to the telephone user results in acoustic instability between the telephone microphone and receiver. The level below which the circuit is considered to be unconditionally stable is referred to herein as the threshold stability level herein. Above the threshold stability level, acoustic instability may result. For example, acoustic instability may result for amplification above 25 dB to 30 dB in gain. The level at which acoustic instability may occur may vary depending on the particular telephone design. Acoustic instability results from coupling of the receiver output to the microphone input and may result in a screeching, wailing, or other undesirable noise artifact.

In order to provide gain above the threshold stability level without producing acoustic instability, some form of duplexing (attenuation) on the microphone transmit wires is required. In the prior art, this required the need to "break" the microphone wires in the line amplifier to insert polarity sensitive line amplifier circuitry and process the microphone signal received from the handset before it is passed to the telephone base. When the microphone wires are broken, the line amplifier does not merely act as a pass through for the microphone signal.

The electrical connection between the handset and base unit typically includes four wires, two of which are connected to the receiver portion and two of which are connected to the microphone portion. In order for the line amplifier to process or attenuate the signal on the microphone wires, the polarity of each wire of the microphone wire pair (i.e., ground or signal) must be matched with the line amplifier circuit.

Because neither the microphone wiring polarity or the output level of the microphone in the handset can be known in advance by the line amplifier manufacturer, various polarity and amplitude settings need to be provided by a compatibility switch or switches on the line amplifier unit. Previous solutions that interrupt the microphone wires for processing, have utilized some type of complicated switching matrix to account for the different polarity possibilities. In addition, different microphone sensitivities may be used by different phone manufacturers, so that the line amplifier must provide a microphone gain adjustment to prevent the output from the line amplifier being too low or too high on the microphone pair. While these solutions work, they require complicated circuitry and may be difficult for a user to operate. This introduces complexity for the user in setting the unit up to work properly with their phone.

As a result, for these and other reasons, there is a need for improved methods and apparatuses for line amplifier circuits.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
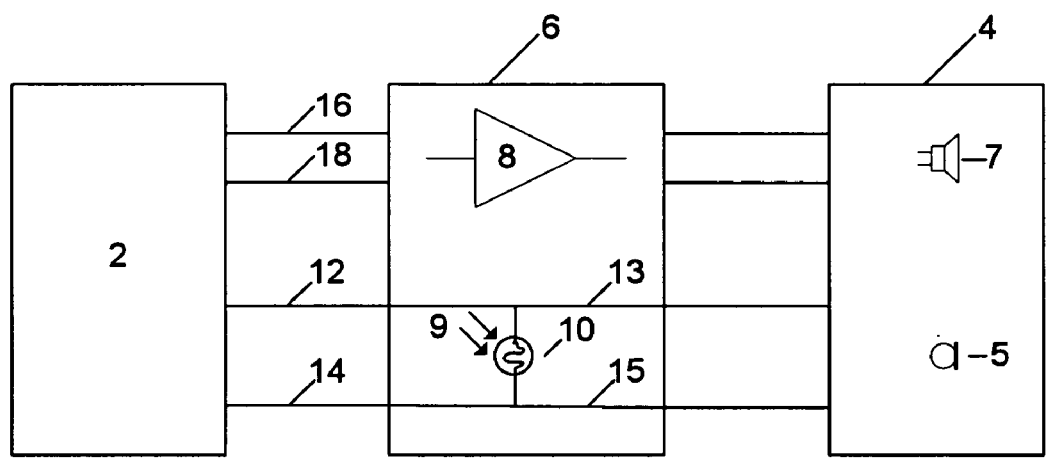
FIG. 1 is a general block diagram of a line amplifier in use with a telephone.

Methods and apparatuses for line amplifier circuits are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Generally, this description describes a method and apparatus for a line amplifier circuit. The line amplifier circuit does not require polarity compatibility of the line amplifier microphone transmit lines with the telephone microphone transmit lines when the line amplifier is inserted between the telephone base and handset, thereby eliminating the need for compatibility switches or circuitry. Furthermore, the line amplifier can provide high gain on the receive signal without producing acoustic instability. Selected attenuation levels are applied to the microphone transmit lines to maintain an overall system gain that is below a threshold level of acoustic instability. This invention results in a line amplifier unit that is significantly easier to set up and operate and offers high gain while maintaining acoustic stability and maximum compatibility with the microphone transmit lines. While the present invention is not necessarily limited to line amplifiers, various aspects of the invention may be appreciated through a discussion of various examples using this context.

In one example of the invention, a line amplifier circuit includes a first microphone transmit line, a second microphone transmit line, and a photo-resistor cell coupled across the first microphone transmit line and the second microphone transmit line. A differential amplifier is also coupled across the first microphone transmit line and the second microphone transmit line. The line amplifier circuit further includes a microcontroller for receiving an output signal from the differential amplifier and a light-emitting diode with a light output controllable by the microcontroller. The photo-resistor cell is operable to attenuate gain on the first microphone transmit line and the second transmit line responsive to the light output controllable by the microcontroller.

In one example of the invention, a line amplifier circuit generally includes a first microphone transmit line, a second microphone transmit line, and a light emitting diode with a controllable variable light output. A photo-resistor cell is coupled across the first microphone transmit line and the second microphone transmit line. The photo-resistor cell is operable to attenuate gain on the first microphone transmit line and the second transmit line responsive to the controllable variable light output from the light-emitting diode.

FIG. 1 is a general block diagram of a line amplifier 6 in use with a telephone. The telephone includes a telephone base 2 and a telephone handset 4 with microphone transmit lines 12, 14 and receiver receive lines 16, 18 there between. Typically, microphone transmit lines 12, 14 and receive lines 16, 18 are contained within a cord with a first end coupled to the telephone base 2 and a second end coupled to the telephone handset 4. Microphone transmit lines 12, 14 transmit a transmit audio signal corresponding to audio received at a microphone 5 located at telephone handset 4. Receive lines 16, 18 transmit a receive audio signal received at telephone base 2 from a telecommunications network to a speaker 7 located at telephone handset 4 for output to a user.

The line amplifier 6 is inserted between the telephone base 2 and telephone handset 4. For example, the second end of the cord containing microphone transmit lines 12, 14 and receiver receive lines 16, 18 is coupled to the line amplifier 6. Line amplifier 6 includes a receiver amplifier 8 for amplifying the receive signal on receive lines 16, 18 from telephone base 2. Line amplifier 6 further includes microphone transmit lines 13, that couple to microphone transmit lines 12, 14. One advantage of the present line amplifier is that the polarity of microphone transmit lines 12, 14 need not be matched to microphone transmit lines 13, 15 when the line amplifier 6 is inserted between telephone base 2 and telephone handset 4 as described in further detail herein. The line amplifier 6 allows for selective attenuation of the microphone transmit lines 12, 14 to reduce acoustic feedback. For example, the gain on microphone transmit lines 12, 14 is attenuated to maintain an overall system gain below a certain threshold stability level as described in further detail herein.

A photo-resistor cell 10 is located across microphone transmit lines 13, 15. In one example, photo-resistor cell is a Cadmium Sulfide (CdS) cell. Photo-resistor cell 10 has a variable resistance dependent on the amount of light 9 received. Photo-resistor cell 10 allows for linear control of the attenuation (duplexing) introduced on the microphone transmit lines 13, 15. Non-linear or harmonic distortion is prevented with the use of linear photo-resistor cell 10 when microphone transmit lines 13, 15 are attenuated, not attenuated, or switched between the two states.

When there is no light 9, photo-resistor cell 10 has a high resistance and is in a non-conducting state. Photo-resistor cell 10 provides complete galvanic isolation from the microphone transmit lines 13, 15. When there is light 9, photo-resistor cell 10 has a low resistance and is in a conducting state. Line amplifier 6 selectively attenuates the gain on microphone transmit lines 12, 14 by controlling the amount of light 9, and therefore the resistance of photo-resistor cell 10. The use of an optical photo-resistor cell 10 allows microphone transmit lines 13, 15 to be attenuated without the need to know the polarity of microphone transmit lines 13, 15. As a result, microphone transmit lines 13, can be coupled to microphone transmit lines 12, 14 respectively without knowing the polarity of microphone transmit lines 12, 14. Microphone transmit lines 13, 15 therefore simply act as a "pass through" the line amplifier 6, eliminating polarity compatibility issues between microphone transmit lines 13, 15 and microphone transmit lines 12, 14.

In one example, line amplifier 6 is intended for use on telephones of individuals who are hard of hearing and require additional amplification of the audio signal in order to properly carry on a telephone conversation. In order to accommodate adjustment of the level of amplification, a potentiometer is provided in the line amplifier 6 and is directly accessible by the user of the telephone to adjust the comfort level of the amplification. Alternatively, a resistor controlled by a field effect transistor could be employed to allow for pushbutton adjustment of the amplification.

Figure 2:
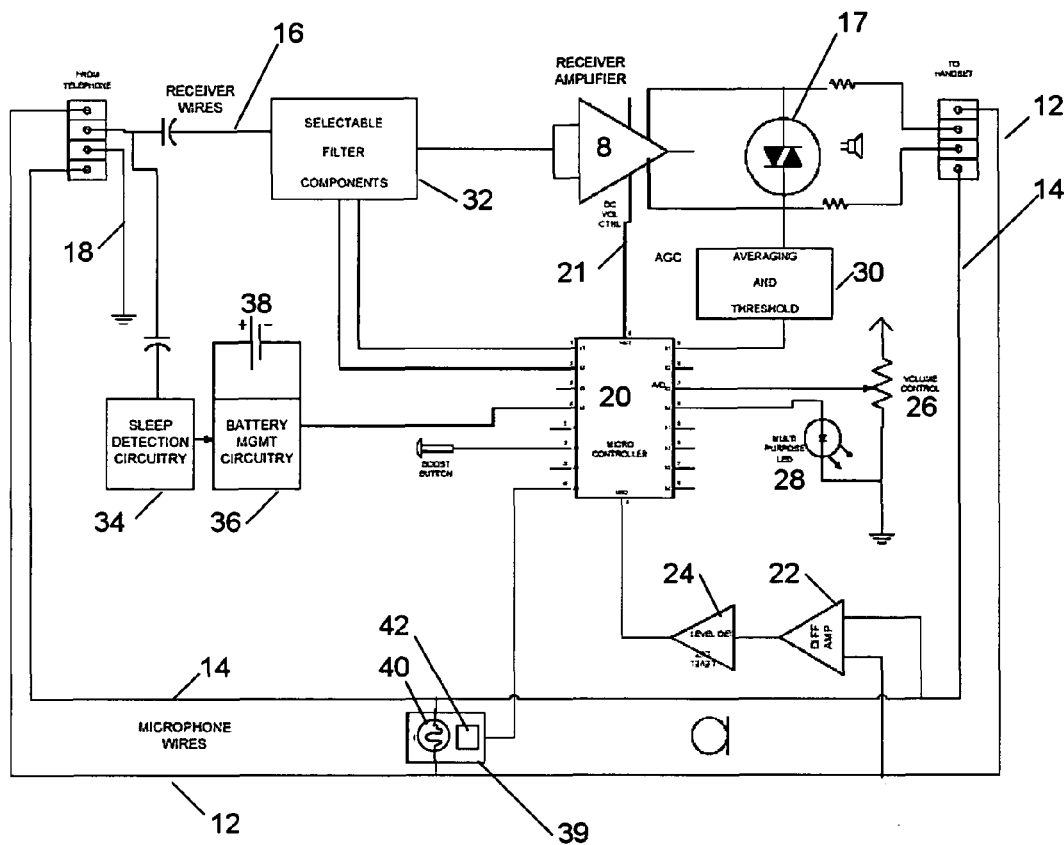
FIG. 2 is top level block diagram for the isolate line amplifier in one example of the invention.

FIG. 2 is top level block diagram for a line amplifier 6 in one example implementation of the invention. Line amplifier 6 includes microphone transmit lines 13, at a first end which are to be coupled to corresponding lines at a handset. A differential amplifier 22 is placed across microphone transmit lines 13, 15. The output of differential amplifier 22 is provided to a threshold detector block 24 which outputs to a microcontroller 20. A microphone control circuit 39 is placed across microphone transmit lines 13, 15. In one example of the invention, microphone control circuit 39 includes a photo-resistor cell and a light emitting diode. For example, the photo-resistor cell is a CdS cell. Microphone control circuit 39 is coupled to microcontroller 20. A second end of microphone transmit lines 13, 15 are to be coupled to corresponding lines at a telephone base. Microcontroller 20 also has a user interface input/output. A volume control circuit 26 allows the user to adjust the gain of the line amplifier 6. For example, volume control circuit 26 is a potentiometer. Microcontroller 20 also interfaces with a multi-purpose light emitting diode 28 to output status indicators to the user.

Line amplifier 6 includes receive lines 16, 18 at a first end which are to be coupled to corresponding lines at a telephone base. In one example, receive line 18 is coupled to ground. Receive line 16 is coupled to a selectable filter components block 32, which allows for multiple frequency response options. The output of selectable filter components block 32 is provided to receiver amplifier 8, which is controlled by microcontroller 20 via a DC control line 21. The gain of receiver amplifier 8 is controllable by volume control circuit 26. The output of receiver amplifier 8 is input to a DIAC 17 which limits the absolute output voltage potential to the speaker to protect the user. The output of DIAC 17 is provided to the speaker at a handset. The output of DIAC 17 is also provided to an averaging and threshold block 30, which is coupled to microcontroller 20 to determine whether there is speech from a far end user on receive line 16.

The receive signal on receive line 16 is also input to a sleep detection circuitry block 34, which is coupled to a battery management circuitry block 36. The battery management circuitry block 36 interfaces with microcontroller 20 and controls operation of battery 38, which provides power to the components of line amplifier 6.

In operation, microphone transmit lines 13, 15 receive a transmit audio signal from a handset microphone. The photo-resistor cell 40 is controlled responsive to using the differential amplifier 22 as a high impedance capacitively coupled device to detect the presence of speech. Differential amplifier 22 amplifies the signal on microphone transmit lines 13, 15 and provides the signal to threshold detector block 24 for processing. Threshold detector block 24 output to microcontroller 20, which determines whether the signal on microphone transmit lines 13, 15 correspond to a speech signal. For example, the signal level is used to determine whether there is speech. Differential amplifier 22 is a high impedance differential amplifier isolated from the transmit lines 13, and draws no appreciable current. The photo-resistor cell 40 and the high impedance, capacitively coupled differential amplifier 22 remove the need to invasively break the microphone transmit lines between the handset and the base unit in order to attenuate gain on the microphone transmit lines.

Microphone control circuit 39 comprises a photo-resistor cell 40 coupled across microphone transmit lines 13, 15 and a light emitting diode (LED) 42 controlled by microcontroller 20. The use of photo-resistor cell 40 advantageously provides an optical connection with galvanic isolation when off. Microcontroller 20 may operate light emitting diode 42 to varying levels of light intensity using a pulse-width modulated (PWM) control signal. In turn, the resistance of photo-resistor cell 40 is determined by the light output of the LED 42. The resistance of the photo-resistor cell 40 can range from near zero ohms to several mega-ohms of resistance. By controlling the resistance of photo-resistor cell 40, microcontroller 20 can apply varying desired attenuation levels to transmit lines 13, 15.

Use of photo-resistor cell 40 is advantageous in that it is used to attenuate microphone transmit lines 13, 15 without the need to know or match the polarity of microphone transmit lines 13, 15. As a result of not having to "break" the lines to incorporate attenuation circuitry, the polarity compatibility of microphone transmit lines 13, 15 need not be matched with microphone transmit lines 12, 14 when the line amplifier is inserted between the telephone base and the handset. The user need not be concerned with polarity compatibility and switch settings. As a result, the line amplifier is considered to be polarity insensitive in this respect. Simultaneously, the line amplifier provides high gain on the receive line without acoustic instability. In the prior art, the use of a MOSFET to apply attenuation to the microphone transmit lines would require the transmit lines be broken and the polarity of the transmit lines be known to control the MOSFET resistance. Furthermore, breaking of the microphone transmit lines within the line amplifier can result in poor compatibility of the line amplifier with the handset microphone since assumptions are made regarding the microphone output level. The microphone output level may vary based on the type of microphone used (e.g., dynamic, strong or weak electric, carbon). In the prior art device, a separate manual gain adjustment on the microphone transmit line may be required.

In one example mode of operation, if microcontroller 20 determines that the signal on microphone transmit lines 13, 15 is a speech signal, the microcontroller 20 controls the light output of LED 42 to be zero, thereby resulting in photo-resistor cell 40 having a high impedance state, effectively disengaging photo-resistor cell 40, and no attenuation is applied to microphone transmit lines 13, 15. The microphone signal travels unimpeded from the handset to the base telephone just as it would if no line amplifier were present. However, if speech is not detected, the photo-resistor cell 40 is activated to produce microphone attenuation, allowing the receiver amplifier 8 to provide gain greater than the threshold stability level, depending on the gain settings made by the user.

In one example mode of operation, the microcontroller 20 controls the operation of microphone control circuit 39 based on the output of differential amplifier 22 and the output of receiver amplifier 8. If microcontroller 20 determines that the signal on microphone transmit lines 13, 15 does not correspond to a speech signal and that a speech signal is present on receive line 16, microcontroller controls the light output of LED 42 to output light, thereby resulting in photo-resistor cell 40 having a low impedance state, effectively engaging photo-resistor cell 40 to apply attenuation to microphone transmit lines 13, 15 to prevent acoustic instability.

In one example mode of operation, the attenuation level applied to microphone transmit lines 13, 15 is varied based on a pre-set maximum system gain level that is determined not to result in acoustic instability if at or below. The system gain level is determined by the gain level applied to the receive signal and any negative gain applied to the microphone transmit lines. The gain level applied to the receive signal is determined by setting of volume control circuit 26. For example, the pre-set maximum system gain level is approximately 25 dB. In one example, the pre-set maximum system gain level is set at the threshold stability level. However, other settings may be used. In a further example, the pre-set maximum system gain level is set below the threshold stability level. The pre-set maximum system gain level may vary depending on the intended application or system designer preference. In this example, line amplifier provides no attenuation when the receiver gain is below the pre-set maximum system level gain. When receive speech is detected and the receiver gain is set above the pre-set maximum system level gain, the controller operates microphone control circuit to introduce negative gain (attenuation) on the microphone transmit lines 13, 15 to maintain the overall system gain at or below the pre-set maximum system gain level.

For example, the quantity of negative gain applied is equal to the difference between the volume control setting and the pre-set maximum system level gain. Such operation is referred to by the inventors as "adaptive duplexing", and is performed when the volume control is set above the pre-set maximum system level gain and there is a receive speech signal detected. The amount of attenuation applied by microphone control circuit is controlled by the light output of LED 42 received by photo-resistor cell 40. Thus, if the volume control is set to 35 dB of gain, when a receive signal is detected, the controller applies negative 10 dB of gain to the microphone transmit lines to produce an overall system gain of 25 dB, where 25 dB is the pre-set maximum system level gain in this example. In this manner, acoustic instability is prevented from occurring. As a result, higher gain levels can be applied to the receive line that would typically result in acoustic instability in prior art devices. Alternatively, a fixed amount of negative gain may be applied or pre-set steps of negative gain may be applied.

In one example operation, in the case of a receiver amplifier gain setting of less than the threshold stability level or a pre-set maximum system gain level, the photo-resistor cell 10 switching is disabled and the system becomes a simple pass through, even if there is no speech detected on microphone transmit lines 13, 15. In this mode, operation is full duplex below the pre-set maximum system gain level.

In one example, the receiver amplifier 8 gain is controlled in the same manner as the transmit gain reduction as described herein. For example, when speech is present at the microphone and no receive audio is present, the gain of receiver amplifier 8 is reduced by the necessary amount by microcontroller 20 depending on the volume control gain setting to maintain stability.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the modes of operation determining the circumstances under which the microphone transmit lines are attenuated based on whether there is speech on the transmit and receive lines and the amount of attenuation applied to the microphone transmit lines. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A line amplifier circuit comprising:
   a first microphone transmit line;
   a second microphone transmit line;
   a photo-resistor cell coupled across the first microphone transmit line and the second microphone transmit line;
   a differential amplifier coupled across the first microphone transmit line and the second microphone transmit line;
   a microcontroller for receiving an output signal from the differential amplifier; and
   a light-emitting diode with a light output controllable by the microcontroller, wherein the photo-resistor cell is operable to attenuate gain on the first microphone transmit line and the second microphone transmit line responsive to the light output controllable by the microcontroller.

2. The line amplifier circuit of claim 1, wherein the photo-resistor cell is a Cadmium Sulfide photo-resistor.

3. The line amplifier circuit of claim 1, further comprising:
   a receive amplifier for applying gain to a receive signal on a receive line, wherein the microcontroller determines whether there is a speech on the receive line.

4. The line amplifier circuit of claim 3, further comprising a volume control circuit operable to adjust a receiver gain level of the receive amplifier.

5. The line amplifier circuit of claim 4, wherein the light output of the light emitting diode is held at zero when the receiver gain level is set below a threshold stability level.

6. The line amplifier circuit of claim 4, wherein the volume control circuit comprises a potentiometer.

7. The line amplifier circuit of claim 4, wherein a gain on the first microphone transmit line and the second transmit line is attenuated by an amount equal to a difference between the receiver gain level and a pre-set maximum system gain level when the receiver gain level is set above the pre-set maximum system gain level and a receive signal is present on the receive line.

8. The line amplifier circuit of claim 7, wherein the pre-set maximum system gain level is a threshold stability level.

9. The line amplifier circuit of claim 1, wherein the differential amplifier is capacitively coupled to the first microphone transmit line and the second microphone transmit line.

10. The line amplifier circuit of claim 1, further comprising a threshold detector coupled between the differential amplifier and the microcontroller.

11. The line amplifier circuit of claim 1, wherein the microcontroller determines whether the output signal from the differential amplifier corresponds to user speech and responsively controls the light output of the light-emitting diode.

12. The line amplifier circuit of claim 11, wherein the light output of the light emitting diode is zero when speech is detected.

13. A line amplifier circuit comprising:
    a first microphone transmit line;
    a second microphone transmit line;
    a light-emitting diode with a controllable variable light output;
    a photo-resistor cell coupled across the first microphone transmit line and the second microphone transmit line, wherein the photo-resistor cell is operable to attenuate gain on the first microphone transmit line and the second microphone transmit line responsive to the controllable variable light output from the light-emitting diode;
    a receive amplifier for applying gain to a receive signal on a receive line; and
    a microcontroller, wherein the microcontroller determines whether there is a speech on the receive line.

14. The line amplifier circuit of claim 13, further comprising a volume control circuit operable to adjust a receiver gain level of the receive amplifier.

15. The line amplifier circuit of claim 14, wherein the controllable variable light output of the light emitting diode is held at zero when the receiver gain level is set below a threshold stability level.

16. The line amplifier circuit of claim 14, wherein the volume control circuit comprises a potentiometer.

17. The line amplifier circuit of claim 14, wherein a gain on the first microphone transmit line and the second transmit line is attenuated by an amount equal to a difference between the receiver gain level and a pre-set maximum system gain level when the receiver gain level is set above the pre-set maximum system gain level and a receive signal is present on the receive line.

18. The line amplifier circuit of claim 17, wherein the pre-set maximum system gain level is a threshold stability level.

19. A line amplifier circuit comprising:
    a first microphone transmit line;
    a second microphone transmit line;
    a light-emitting diode with a controllable variable light output;
    a photo-resistor cell coupled across the first microphone transmit line and the second microphone transmit line, wherein the photo-resistor cell is operable to attenuate gain on the first microphone transmit line and the second microphone transmit line responsive to the controllable variable light output from the light-emitting diode;
    a differential amplifier capacitively coupled to the first microphone transmit line and the second microphone transmit line;
    a threshold detector coupled to an output of the differential amplifier; and
    a microcontroller which determines whether an output signal from the threshold detector corresponds to user speech and responsively controls the controllable variable light output of the light-emitting diode.

20. The line amplifier circuit of claim 19, wherein the controllable variable light output of the light emitting diode is zero when speech is detected.

* * * * *